Feb. 22, 1955  A. J. ASCH  2,702,412
CONSTRUCTION JOINT FOR PANEL ASSEMBLIES
Filed Dec. 13, 1952  2 Sheets-Sheet 1
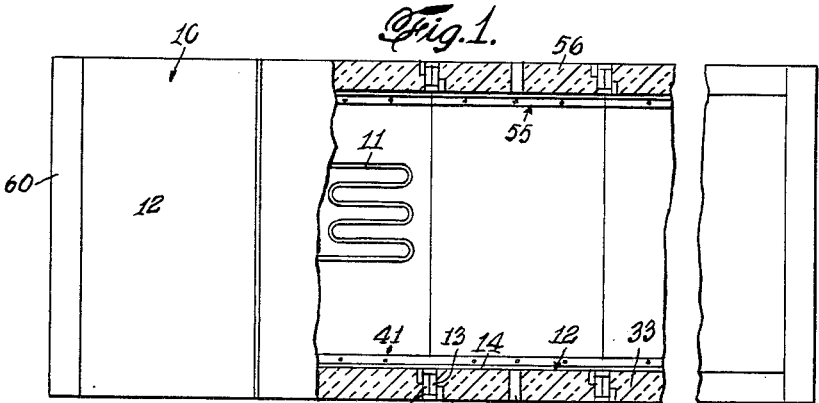
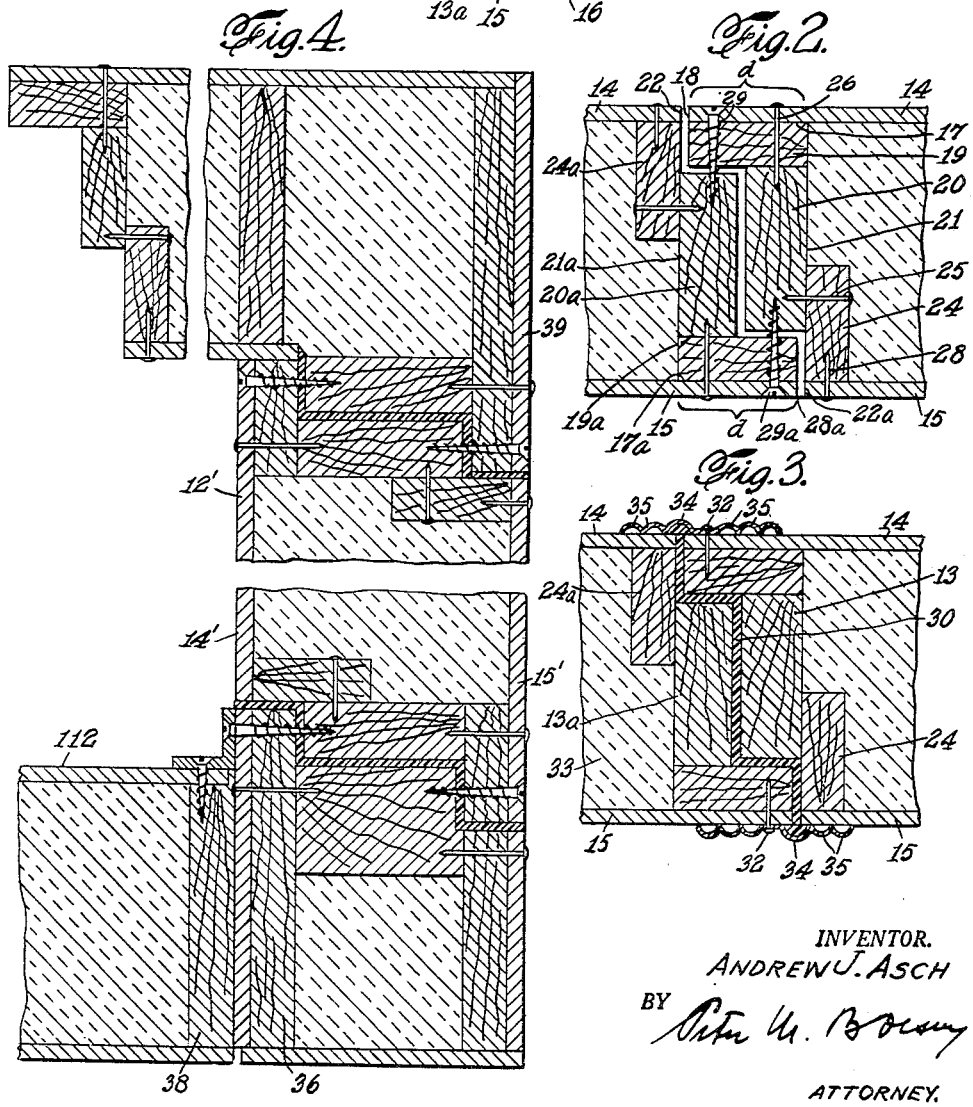
INVENTOR.
ANDREW J. ASCH
BY
ATTORNEY.

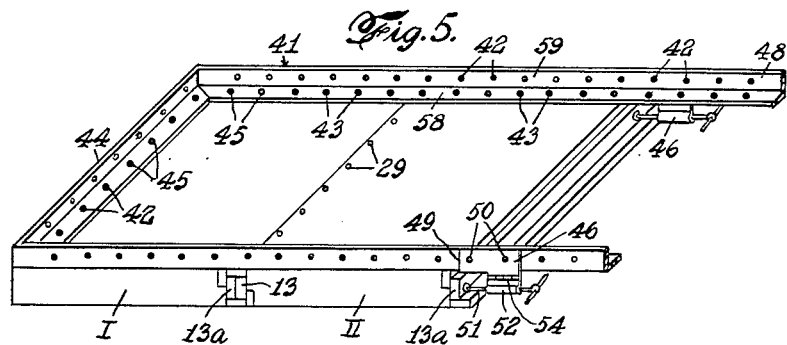
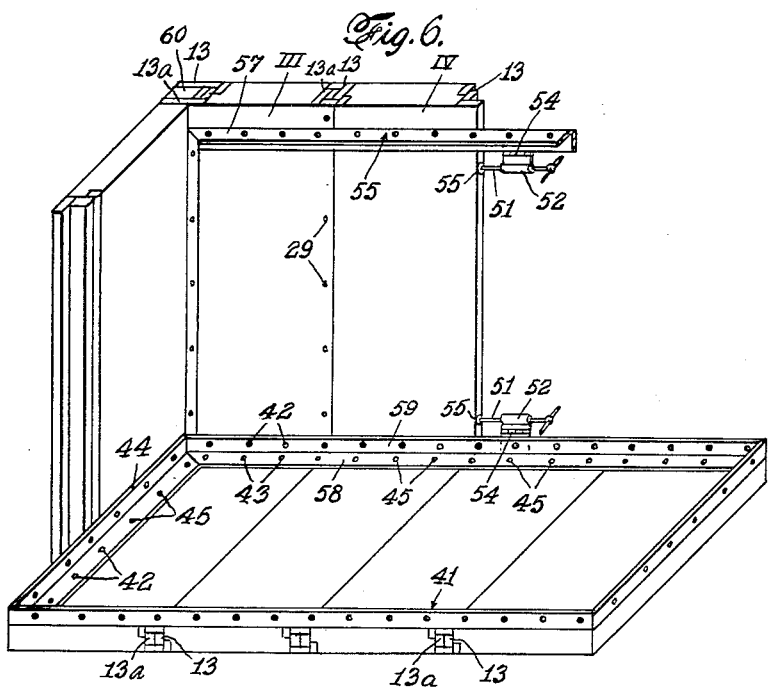
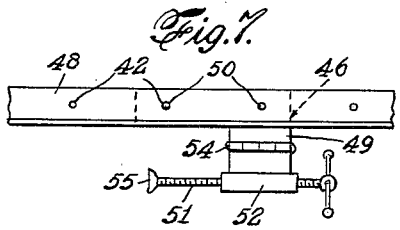
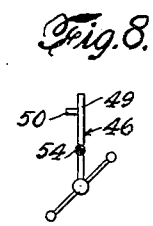

United States Patent Office 2,702,412
Patented Feb. 22, 1955

2,702,412

CONSTRUCTION JOINT FOR PANEL ASSEMBLIES

Andrew J. Asch, New York, N. Y.

Application December 13, 1952, Serial No. 325,768

5 Claims. (Cl. 20—2)

This invention relates to vaults, cabinets or rooms in which a difference is maintained between the temperature in the interior of the vault and that of the external surroundings, and more particularly to the construction of such vaults when formed from more or less standardized panels as construction units.

In practice such vaults or rooms are usually assembled on what is to be their permanent location and the assembly requires the joining of panels in a vapor-tight manner with a minimum of tools.

Heretofore the unit panels have been of the nature of spaced wall members having the space therebetween adapted to be filled with insulating material, the wall members being secured to edge or perimetric framing. In some cases the opposite edges of the panel were provided with a tongue and groove so that a fit between adjacent panel units would be as tight as possible. The mated edges of adjacent panel units were then drawn together by bolts passing through the tongued edge of one panel and the grooved edge of the adjacent panel. Access to the bolts required arm holes in the wall members which had to be subsequently covered or they reduced the effective thickness of the panel.

Moreover, during assembly or erection of the vault, inaccuracies of fit would develop, so that a tightening of one joint between panels would loosen that of another. Gaskets at the joints proved to be unsatisfactory.

The prime object of this invention is to provide a unit panel with edge joints which are simple in construction require no arm holes and yet will securely enable the joining of adjacent panels.

Another object is to provide such a joint that will not trap any liquid moisture that might form between the panels.

In the accompanying drawings showing, by way of example, one of many possible embodiments of the invention:

Figure 1 is a fragmental front view of the vault. Figure 2 is a sectional view of the joint. Figure 3 is a sectional view of the joint as sealed and covered. Figure 4 is a fragmental sectional view showing the joints at the corners. Figure 5 is a perspective view of the floor of the vault construction. Figure 6 is a perspective view of the side and end panels. Figure 7 is a side view of the pull up tool; and Figure 8 is an end elevation of the tool shown in Figure 7.

The invention is shown in connection with a so-called freezing vault, or room, 10 having a cooling coil 11 therein. The room is formed by the joining together of a plurality of unit panels 12 which are the chief units of construction. With the exception of special sizes and shapes for corner pieces and to provide doorways (not shown) the identical panels may be used as floors, walls and ceilings, though for economy, appearance, operating conditions, etc., it may be advisable to vary the materials of the panel according to the use of same.

Each panel 12 comprises spaced inner and outer walls 14 and 15 which may have studding 16 therebetween.

At each side edge of the panel, the walls are laterally off-set to provide symmetrical extensions 17 and 17a of each wall past the other, as indicated by the distance d in Figure 2, from the respective ends 18 and 18a of walls 14 and 15. Thick marginal wooden strips 19 and 19a, the length of the panel, are secured to the inner faces of the respective extensions 17 and 17a along the margins of the wall. These strips are substantially rectangular in cross section and have mounted edgewise upon them stud strips 20 and 20a of thickness equal to about half the width of the marginal strips. The width of the stud strips is equal to the distance between the walls 14 and 15 less twice the thickness of the marginal strip. The marginal and stud strips form an agle piece of L shape in cross section, the inner faces 21 and 21a of the angle piece in line with the opposed wall ends 22 and 22a. Thick connector strips 24 and 24a mounted on the inner faces 21 and 21a are secured to the inner faces of the respective wall 15 and 14. The three types of wooden strips such as 17, 20 and 24 are secured together by glue and by nails 25 and 26, the latter securing the wall 14 to strip 19. A nail 28 secures the wall 15 to the connector strip 24. The three types of strips form a series of mating steps to aid in fitting the panels together. The securing together of the panels is accomplished by means of screws 29 and 29a the former passing through wall 14, strip 19 and into stud strip 20a. For clarity, Figure 2 shows an exaggeratedly loose fit.

The space between adjoining walls and strip sets is filled with a mastic sealer or sealing packing 30 as in Figure 3. Such sealers are semi-liquids and tend to become extruded from the joint. This is generally of little consequence when conditions are constant. However, especially if the vault is in intermittent service, the extrusion of the sealer greatly reduces its effectiveness to exclude water vapor since there is virtually no tendency for the sealer to creep back after it has been forced out. The extrusion is markedly increased when moisture freezes. I have found that there is no danger of extrusion if the joint is covered with a beaded, springy strip of metal 31 to engage the mastic, and secured to the wall as at 32 by a nail in the middle of the strip.

Preferably there should be a large concave bead 34 filled with mastic and over the crack and one or more small beads 35 lateral from the nail and crack. The smaller beads may receive a part of the extruded mastic if the extrusion force is very great, but the resilience of the metal strip will always force the mastic against the wall. However the major action appears to be merely extrusion against the springy metal and a pushing of the mastic back when the inside temperature falls.

Of course it is desirable to fill the space between walls 14 and 15 with insulation 33 such as glass wool and the like.

Each set of the three types of strips forms what might be called a composite step-member which mates with a corresponding member in an adjacent panel. These step members may be said to provide double over-laps.

By having the step members composed of strips, they afford greater flexibility which is necessary during the erection of the vault.

While the joint is frequently used merely on side edges of a panel it may of course be used on end edges as well. For example a sleeper member 36 in Figure 4 is shown supporting a panel 12' having the joints on each end. Of course, any panel such as 12 may be squared off and provided with a stop-strip such as at 38 on any edge where such an edge must abut a surface other than one provided with the standard joint. Likewise corner pieces such as for a ceiling, as shown at 39 may be provided with the joints so as to fit on to an adjacent panel.

While I do not limit the material of the walls, I prefer an inner wall 14' of sheet metal and an outer wall 15 of plywood. Sheet metal bonded to plywood may, of course, be used.

It will be noted that any moisture collecting in the joints of the vertical panel 12' of Figure 4 either at the sleeper or ceiling will tend to flow by gravity to the exterior, owing to the fact that the joints provide a downwardly and outwardly set of steps for the moisture to flow down. The joints are, of course, filled with sealer to prevent as much as possible the entrance of vapor.

In the construction of the floor of the vault, there is provided a rectangular framing 41 of angle iron having a plurality of longitudinally spaced perforations 42 in the horizontal flange 58 and a similar set of perforations 43 in the vertical flange 59. A portion 44 of the framing is secured to the upper face of a flatly disposed first panel (designated I in Figure 5) by means of screws 45 passing through some of the perforations 42. Beneath the framing and adjacent the first panel I, there is placed a second panel II.

The forcing of the panel II tightly against panel I is accomplished by means of a swiveled screw pull-up tool 46 temporarily mounted on an extending portion 48 of the framing. The tool comprises a plate 49 provided with studs 50 fast thereon and spaced the same distance as the perforations, so that they may be received in the perforations in the frame. A hand screw 51 and threaded mount 52 therefor is hinged, as at 54, to an edge of the plate 49. By having the mount 52 hinged the studs may be placed in perforations in either flange of the angle iron so as to permit engagement of the end face 55 of the screw with the edge of the panel. The axis of the screw always remains parallel to angle iron no matter how the hinge is turned. Two tools, one at each end of the floor panel are used.

In a similar manner side panel 17 is drawn against side panel III in Figure 6, where the advantage of the hinging 54 is even more clearly demonstrated due to the fact that perforations 43 have all been filled by the screws 45. If a simple offset screw mount were used, the pull-up tool could not be used for symmetrical locations or at right and left hand corners.

Each panel is provided with a step member 13 at one edge and 13a at the other, although one of these may be omitted, if desired, as shown in Figure 5 at an end or corner. Preferably, each single panel is drawn up tight against its mate before the panel is secured to the floor frame 41 and/or the ceiling frame 55.

The ceiling frame 55 is of the same size and shape as the floor frame 41 and supports a ceiling 56, made up of panels of exactly the same size, shape, and number as those of the floor, resting on the horizontal flange 57 of the frame 55.

Thus the completed vault consists essentially of congruent upper and lower rectangular frames of angle iron at the perimeter of the ceiling and the floor, respectively, the horizonttal flange of the lower frame being secured to the floor, and the ceiling secured on the flange 57. Side panels encase the frames and edges of the floor and ceiling, and are secured to the vertical flanges of the frames.

The panels may all be alike whether used as sidings, floors or ceilings.

Of course, at edges, such as corners, the step members can not fit together in the same manner, as when the panels are all in the same plane, and compromise corner members 60 may be used.

Sometimes it is more desirable to square off an edge by means such as a stop 38 in Figure 4, when a panel must adjoin another at right angles. However, since the construction usually requires a number of panels side-by-side and edge-to-edge the great majority of the panels have a step member at each edge.

Doorways may be provided in a conventional manner.

The above description and accompanying drawings are for purposes of illustration and many changes will be apparent to those skilled in the art without departing from the scope of this invention.

What I claim as new, and desire to secure by Letters Patent of the United States, is:

1. A panel comprising a pair of parallel spaced inner and outer walls of substantially the same size and off-set from each other to provide extensions of one wall past the other, edge mounting means including a marginal strip of wood along the inner face of one of said extensions and laterally terminating at the outer edge of the extension; a wooden stud-strip of a thickness equal to half the width of the marginal strip and edgewise thereon to form an angle piece of L shape in cross section, the back face of the angle piece being alined with the outer edge of the opposite wall; a nail passing through the extension, the marginal strip and into the stud strip; the latter terminating short of the opposite wall by a distance equal to the thickness of said marginal strip; a connector strip disposed against the inner face of the opposite wall and against said back face of the angle piece; a nail passing through said opposite wall and into the connector strip, and a nail passing through the connector strip and into the stud strip, said extension and outer half of the marginal strip thereon being provided with a screw hole.

2. A panel, as in claim 1, and a like panel joined thereto edge-to-edge and a screw in said hole and passing into the stud strip of the additional panel.

3. In a temperature controlled vault, a pair of panels substantially edge-to-edge, each having an inner wall member in the same plane; a marginal strip secured along the outer face edge portion of one of the members, and a wooden stud strip secured on edge to said marginal strip to provide an angle piece of L shape in cross section, the thickness of the stud strip being equal to half the width of the marginal strip; a connector strip secured along the outer face and at the edge of the second inner wall member; a second stud strip being the width of the first stud strip and disposed between the latter and the connector strip and secured to the connector strip; outer wall members, means for mounting said outer wall members on the respective stud strips, and a screw passing through the first mentioned inner wall member, the marginal strip, and into the second stud strip.

4. A combination comprising a panel, as in claim 1, the panel being erect and having upper and lower horizontal edges, said edge mounting means being at the upper and lower horizontal edges of the panel; a sleeper supporting said panel and having a joint to mate with the lower edge mounting means; and a ceiling piece resting on said panel and having a joint to mate with the edge mounting means, the extension of the outer wall projecting downwardly and the extension of the inner wall upwardly.

5. A panel comprising a pair of parallel spaced inner and outer walls substantially the same size and off-set from each other to provide extensions of one wall past the other; edge mounting means including a marginal strip of wood along the inner face of one of said extensions and laterally terminating at the outer edge of the extension and having faces parallel with said walls; a wooden stud-strip secured edgewise on the marginal strip to form an angle piece of L shape in cross section, the back face of the angle piece being alined with the outer edge of the opposite wall; a nail passing through the extension, the marginal strip and into the stud strip; the latter terminating short of the opposite wall by a distance equal to the thickness of said marginal strip; a connector strip disposed against the inner face of the opposite wall and against said back face of the angle piece; a nail passing through said opposite wall and into the connector strip, and a nail passing through the connector strip and into the stud strip, said extension and outer half of the marginal strip thereon being provided with a screw hole.

References Cited in the file of this patent

UNITED STATES PATENTS

| Number | Name | Date |
|---|---|---|
| Re. 21,524 | Gramelspacher | Aug. 6, 1940 |
| 132,345 | Woolfolk | Oct. 15, 1872 |
| 764,128 | Jeffords | July 5, 1904 |
| 845,770 | Ferris et al. | Mar. 5, 1907 |
| 1,045,223 | Uhlinger | Nov. 26, 1912 |
| 1,640,080 | Hieb et al. | Aug. 23, 1927 |
| 1,684,898 | Trautman | Sept. 18, 1928 |
| 1,805,812 | De Witt | Mar. 19, 1931 |
| 2,346,630 | Wagner | Apr. 11, 1944 |
| 2,407,004 | Guignon, Jr. | Sept. 3, 1946 |
| 2,446,860 | Wallace | Aug. 10, 1948 |
| 2,452,640 | Elmendorf | Nov. 2, 1948 |
| 2,476,501 | Maniscalco | July 19, 1949 |

FOREIGN PATENTS

| Number | Country | Date |
|---|---|---|
| 450,555 | Great Britain | July 21, 1936 |